United States Patent [19]

Bryer

[11] 4,209,813

[45] Jun. 24, 1980

[54] DUAL MAGNETIC HEAD MOUNTING AND LOADING

[75] Inventor: Philip S. Bryer, Woodland Hills, Calif.

[73] Assignee: PerSci, Inc., Los Angeles, Calif.

[21] Appl. No.: 4,293

[22] Filed: Jan. 18, 1979

[51] Int. Cl.² ............................ G11B 5/48; G11B 5/54
[52] U.S. Cl. ......................................... 360/105; 360/99
[58] Field of Search ............ 360/105, 106, 107, 97–99, 360/86, 135, 104; 346/137

[56] References Cited

U.S. PATENT DOCUMENTS

| Re. 29380 | 8/1977 | Castrodale et al. ................. 360/105 |
| 3,768,083 | 10/1973 | Pejcha ................................. 346/137 |
| 4,085,428 | 4/1978 | Green et al. ........................... 360/99 |

OTHER PUBLICATIONS

IBM Tech. Disc. Bull., E. L. Bailey et al., Read/Write Head Load–Unload Device, vol. 18, No. 7, Dec. 1975, pp. 2246–2247.
IBM Tech. Disc. Bull., S. E. Wheeler, Magnetic Head Load–Unload Device, vol. 18, No. 9, Feb. 1976, pp. 3018–3019.

Primary Examiner—Alfred H. Eddleman
Attorney, Agent, or Firm—Smyth, Pavitt, Siegemund, Jones & Martella

[57] ABSTRACT

Two magnetic heads are mounted respectively in front of two springs, and face each other across a gap in a frame into which a recording disk can be exerted. The springs are respectively flexed back by means of two spring biased pivot levers, so that the heads do not engage the disk. These levers have tongues in their front, which hold the springs down. A cone-ball actuator pivots the lever towards each other permitting, in turn, the springs to flex towards each other so that the heads engage the disk.

6 Claims, 8 Drawing Figures

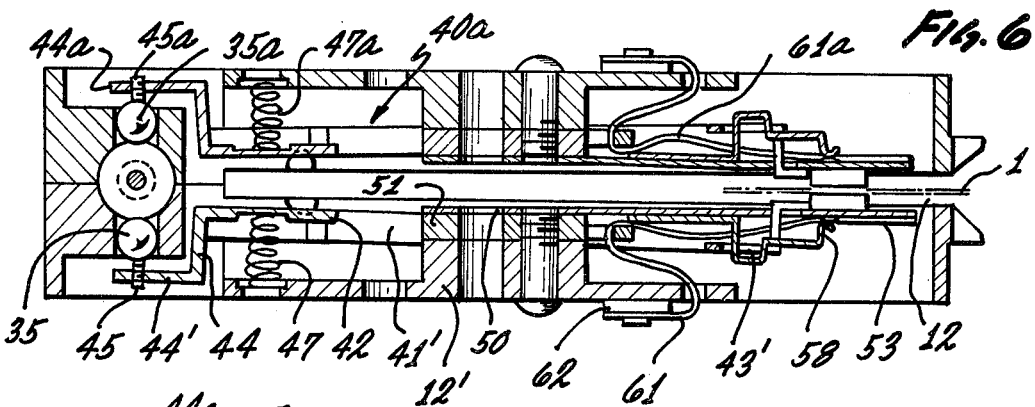
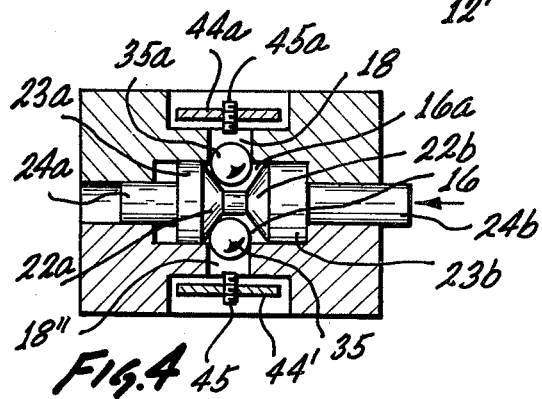
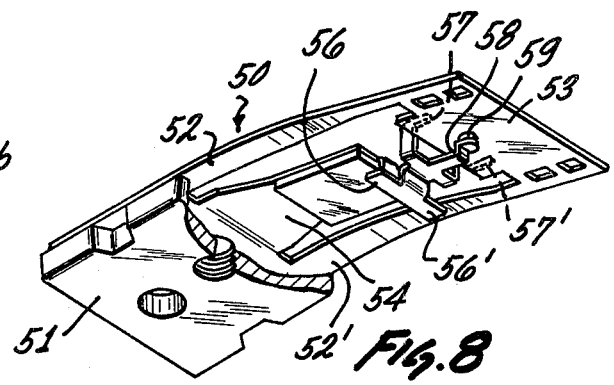
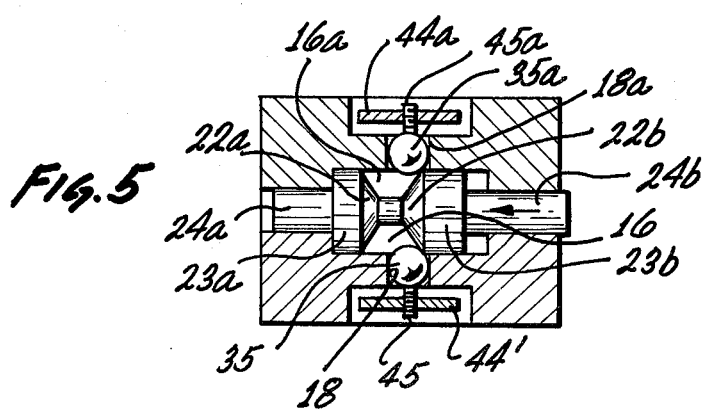
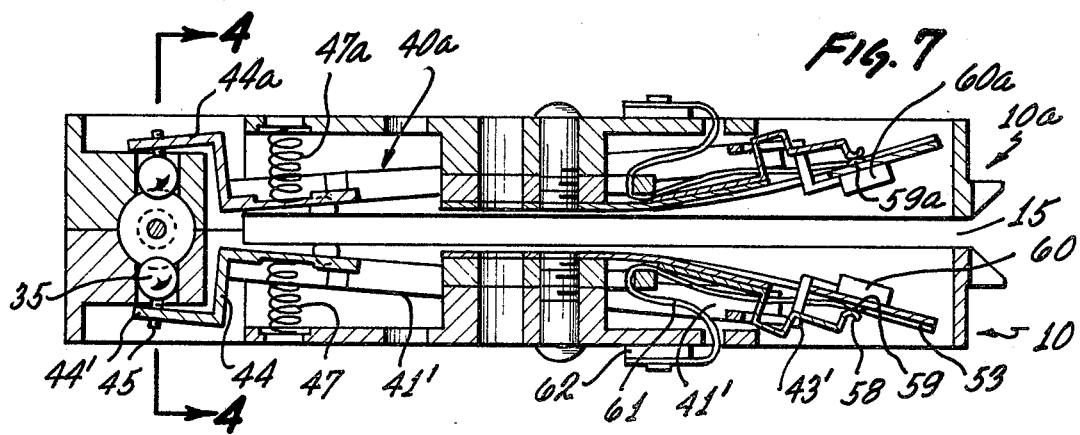

DUAL MAGNETIC HEAD MOUNTING AND LOADING

BACKGROUND OF THE INVENTION

The present invention relates to the mounting of a magnetic recording head in relation to a flexible recording medium, such as a magnetic disk; and more particularly, the invention relates to head loading in flexible disk systems in which two heads are either caused to engage the disk from opposite sides or are retracted therefrom.

It is generally known to mount such heads on resilient carriers which are flexed back and restrained in the head retracting position, while release of the restraint causes the resiliency of the carriers to urge the heads towards each other and in engagement with a flexible medium in between. The heads are urged into this engaging position by the resiliency of the carrier and at a particular force. The amount of force so exerted upon the disk must be very small, such as 7 grams.

A conventional head mounting structure is constructed for the purpose above uses two non-resilient members which are pivotably connected to stationary frame parts, each carrying spring means for mounting the heads. Upon pivoting the members towards each other, the heads engage the media as described. The springs carrying the heads are normally relaxed but are flexed on contact with the medium and, through the medium, flex each other. The known springs for this purpose are constructed in that a center leaf spring extends from a mounting piece, and a thin mounting platform for the head is disposed in front of the center leaf spring and held by thin arms extending from the mounting piece along both sides of the center spring. The latter is additionally provided with arms or extensions extending above and below the platform. The arm below engages the platform when the non-resilient mounting members are pivoted towards each other to exert a definite force upon the head carrying platform and in the head loading position. The arms above the platform extend alongside the head and engage the platform when the center spring is permitted to relax, carrying the platform back as the non-resilient mounting members are pivoted back.

While the spring construction as outlined in the previous paragraph is of a quite advantageous design, its mounting and actuation is actually insufficient to establish the desired accuracy of the force being exerted. It was found, particularly, that the mounting of these springs on pivotable members by means of mounting pieces permits only inadequate control of the spring actuation and head loading force.

DESCRIPTION OF THE INVENTION

It is an object of the present invention to provide a new and improved dual head mounting structure for positioning and loading magnetic heads from opposite sides against a flexible recording medium, in which the forces exerted upon the heads for an engaging position are more accurately determinable and reproducable than was heretofore possible.

It is a particular object of the present invention to control the loading of a magnetic recording head for engagement with a flexible disk.

It is a specific object of the present invention to provide dual head loading under utilization of two, three arm springs, each of which has its arms extending integrally from a common mounting sheet or piece. The two outer spring arms carry and balance a platform sheet on which is mounted one of the heads. The center spring arm in each instance is provided with a tongue which may engage the platform opposite the head, and is further provided with two prongs or extensions extending alongside the head and may also engage the platform but on the head mounting side.

In accordance with the preferred embodiment of the present invention, it is suggested to provide a frame part which defines a gap for receiving a flexible disk and having two mounting spaces opposite the gap, respectively housing the springs of the type referred to in the specific object; the mounting pieces of these springs are affixed to the frame. A rocking lever is pivoted in each of the spaces which is spring biased to normally pivot the respective lever away from the gap. The center spring of each of the springs is further provided with lugs which engage tongues of the lever arm to cause the center spring arm to be flexed away from the gap, whereby the two prongs carry the platform with them as flexedly held by the outer spring arms. Operating means are provided to overcome the spring bias for the rocking levers to pivot them towards the gap permitting the flexed springs to relax, and the tongues on the respective center arms push the platform back until the two heads engange or engage the medium in between, at a force being predominantly determined by the spring characteristics of the two center spring arms. The above-mentioned operating means include a cone-ball shuttle to pivot the rocking levers towards the gap; the cone is preferably displaced for this purpose by a relay. Upon de-energization of the relay, the spring bias of the rocking levers restores the head retract positions and pushes the balls so that they shift the cone to the deactivated position and state. The cone-ball actuator may have an intermediate operational state in which the spring biased levers are pivoted towards each other but for a distance only insufficient to cause the heads to engage each other or the recording medium in between. This way, one shortens the travel path length for the heads on final energization so that the speed of impact of the heads upon the recording medium is relatively small.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 4 and 5 are section views, respectively, taken along lines 4—4 and 5—5 in FIGS. 7 and 6;

FIGS. 6 and 7 are section views taken, respectively, along lines 6 and 7 in FIGS. 5 and 4, whereby FIGS. 4 and 7 show the heads and head loading structure in retracted position, and FIGS. 5 and 6 show the heads and head loading structure in operating position, engaging a disk; and FIG. 8 is a perspective view from below of one of the springs for head loading.

Figure 2:
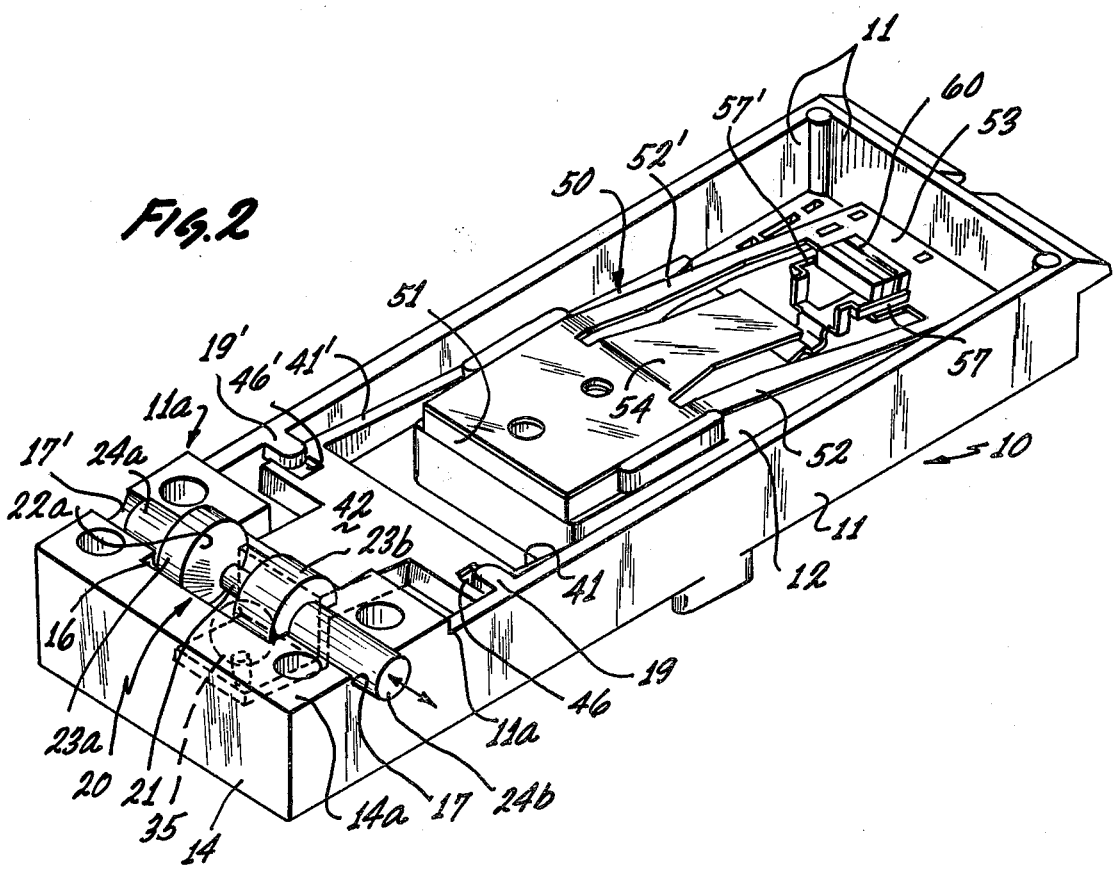
FIG. 2 shows the frame portion for mounting one head, which is the lower portion of the mount shown in FIG. 1 but a relay and the complementary upper frame part having been removed.

Proceeding now to the detailed description of the drawings, the figures illustrate a head mounting structure which has an overall fork-like configuration. The frame 10 establishing this fork is made up from two similar parts 10 and 10a. Each frame part has wall portions 11 and a bottom 12 establishing a hollow interior; the wall portions are recessed by means of shoulders 11a leading to a face 14 in the rear of each frame part. The two frame parts, are interconnected in these faces. Just one, 14', is visible in FIG. 2, there is a corresponding face in part 10a, and the two faces interface when the members 10, 10a are riveted together across the resulting interface by means of rivets 13. Due to the shoulders 11a, a gap 15 is established between the two members 10, 10a when interconnected, and a disk 1 can be inserted into that gap 15 from an opening at the front end of the two interconnected members.

The hollow space between the walls 11 in each member 10, 10a is provided to accommodate a magnetic head and its mounting, positioning and loading structure. The rear portion of each member is provided with half of a cylindrical cavity such as 16 for member 10, and that half cavity is coaxial with two half-cylinder recesses 17, 17' of smaller diameter. These cavities, 16 and 16a as well as the recesses in the two members 10, 10a, complement each other so that upon joining these members, the complementary cavities define a shuttle chamber 16, 16a, which is coaxially positioned between two bores, resulting from complementary configuration and positioning of the recesses such as 17, 17' etc.

The cylindrical space 16, 16a, so defined, establishes and receives a shuttle 20 being of double cone configuration having a short stem 21 between two cones 22a and 22b which, respectively, extend from cylindrical portions 23a, 23b of which the latter is longer to establish therewith an asymmetrical relationship.

A pin 24a extends from cylinder 23a to serve as longitudinal bearing member for holding the shuttle 20 in one of the two bores which extend from shuttle chamber 16-16a. A longer pin 24b on the other side, and extending from cylinder 23b, serves as the actuation pin or plunger for causing the shuttle 20 to be moved by external displacement action.

A relay 30 is mounted to the rear of the assembled members 10, 10a having an armature 31 which extends for a short distance alongside members 10 and 10a for engagement with pin 24b. Energization of the relay pushes the pin 24b inwardly; spring bias acting on the pin 24b (to be described) tends to push the pin out so that the armature returns upon de-energization of the relay.

Figure 3:
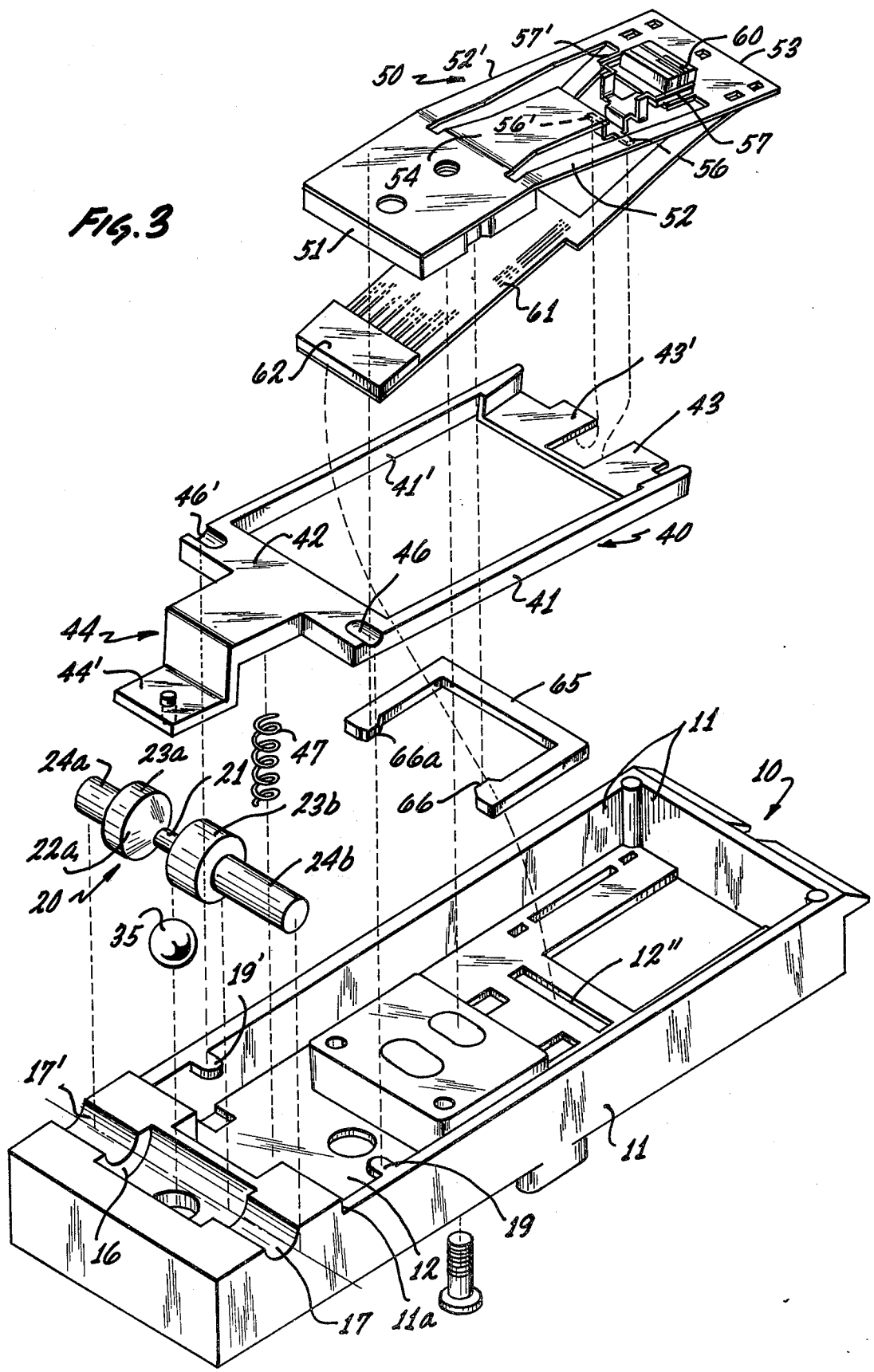
FIG. 3 is an exploded view of the structure shown in FIG. 2.

Each of the members 10, 10a is additionally provided with a duct 18, 18a, respectively, which extend transversely from the shuttle chamber 16, 16a (see FIG. 3 et seq). These ducts 18, 18a, respectively, contain balls 35, 35a which balls can, however, move into the shuttle chamber unless prevented by the cone 22b. That cone is the primary ball actuator. Upon being pushed into a position shown in FIG. 5 by means of pin 24b (which, in turn, is so pushed by the armature of the energized relay), the balls 35, 35a are forced into the ducts 18, 18a. Upon retraction of the shuttle (position shown in FIG. 4), the balls lodge to some extent adjacent to stem 21.

Cone 22a prevents escape of the balls in the other direction.

The assembly as described in the preceeding paragraphs constitutes the primary actuator part. Upon energizing relay 30, the balls 35, 35a are moved away from each other into the ducts 18, 18a. Upon de-energizing relay 30, the balls 35, 35a are pushed back in a manner described, which displaces the shuttle (transition from FIG. 5 to FIG. 4) which, in turn, pushes pin 24b out and causes the armature to return.

The balls 35, 35a are provided to move the individual head positioning and loading devices. These devices include pivot members or two arm levers 40, 40a, which are, respectively, disposed in the interior of members 10, 10a. The head loading devices include additionally spring members 50 and 50a, respectively, for the magnetic heads 60 and 60a.

Each of the pivot members or levers 40, 40a is of an overall rectangular loop-like configuration, established by side bars 41, 41', a rear bar 42, and joined front end tongues 43, 43'. A cam element 44 extends from the rear bar 42, having a tongue 44' on which is threaded a pin 45. The pin 45 extends from the tongue 44' for a distance which is determined by the requirement that it should always remain engaged with ball 35. The other member 40a is analogously constructed, and its tongue 44a carries a pin 45a which is to be in engagement with ball 35a.

The rear bar 42 is provided with a pair of semi-cylindrical recesses 46, 46', which grip under and receiver mating lugs 19, 19' to establish a pivot axis about which member 40 can pivot. A spring 47 is interposed between member 44 and the bottom 12 of frame part 10 for biasing the lever member 40, so that its recesses 46, 46' do engage the lugs 19, 19'. Moreover, this spring 47 pivots member 40 into such a position so that pin 45 tends to push ball 35 inwardly. Member 40a is analogously pivoted in frame part 10a and biased by a spring 47a.

Springs 47 and 47a provide the force which tends to displace the cone 23b of shuttle 20, so that the pin 24b is moved out (FIG. 4). Consequently, shuttle member 40 is now held in a position in which its front end tongues 43, 43' are moved away from the slot 15 (see FIG. 7). Upon energizing relay 30, the cone 23b pushes the balls 35, 35a out (FIG. 5), causing the front ends of members 40, 40a to pivot towards each other as shown in FIG. 6, which brings the tongues, such as 43, etc., closer to the gap 15.

The pivot motion of the lever members 40, 40a is imparted upon the heads by means of the loading springs 50, 50a, being of rather complex design, to very accurately meter the effective head loading forces in a manner which is greatly independent from the actuator forces by means of which members 40 and 40a are pivoted into the operating position shown in FIG. 6.

The loading spring 50 (see FIGS. 3 and 8) is mounted to a plate 51 which, in turn, is mounted to a raised portion 12' of the bottom 12 of member 10. The spring 50a is analogously mounted to a raised bottom portion in member 10a. The spring 50 has two arms 52, 52' the front ends of which hold a mounting platform 53 for the head 60. The primary element of spring 50 is a central leaf spring 54 which provides the principal resilient flexing of this member 50. A U-shaped part 55 and two lateral lugs 56, 56' extend from the front end of spring 54. The tongues 43, 43' of lever and rocking member 40 grip over these lugs in the sense that upon pivoting the front of member 40 away from the gap 15, the tongues 43, 43' as engaging the lugs 56, 56' flex the end of spring 54 in the same direction. Upon pivoting the members 40, 40a towards each other, the respective tongues yield and permit the springs 54, 54a to relax and to yield resiliently until the heads 60, 60a engage each other or the medium between them.

The resilient yielding as well as the forced bias of springs 54, 54a by operation of the pivot members 40, 40a is transmitted upon the head 60 as follows. A pair of arms or prongs 57, 57' extend from part 55 alongside the head but they are normally disengaged from platform 53. Upon pivoting spring arm 54 towards the unload position (FIG. 7), these arms engage platform 53 and carry the platform 53 and the head 60 thereon away from the gap 15.

A third arm with crimped tongue 58 extends axially or forward from part 55 adjacent to and underneath the platform 53a. That arm/tongue 58 is disengaged from the platform 53 opposite the head mounting surface when the spring is flexed back (FIG. 7). Upon pivoting member 40 from that unload position to the position of FIG. 6, the relaxing spring 54 causes arm 57, 57' to disengage from platform 53, while the tongue 58 engages the platform 53 from the rear urging it to follow the movement of these parts towards gap 12. The flexing back of spring arms 52, 52' aids in that return, but the dominant force is provided by the spring 54 which, through portion 55, causes the tongue 58 to push the platform 53 towards the gap 15 at a precisely determined force.

It should be noted that, upon pivoting member 40 towards the load position, the lugs 56, 56' remain engaged with tongues 43, 43', but the spring 54 does not push the lever 40. The levers 40 and 40a are pivoted by operation of the shuttle and the balls. Thus, the head positioning force is provided for by the resilient bias of springs 54, 54a, whose force is not, so to speak, diluted by performing other tasks.

The tongues 58, 58a should engage the platform 53, 53a precisely in line with the center of gravity of the respective head. In order to establish this condition more positively, dimples such as 59, 59a should be placed in the rear of the platforms 53 and 53a, respectively, establishing that point so that the lug will engage that point with certainty.

Figure 1:
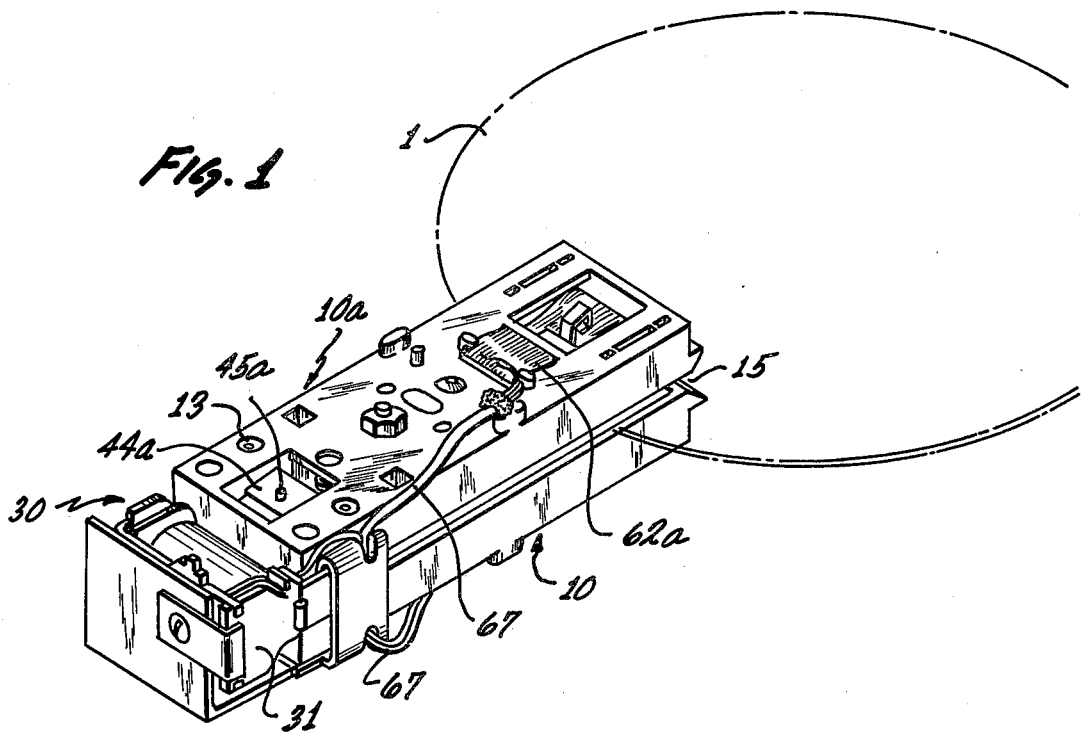
FIG. 1 is a perspective view of completely assembled dual head mounts showing also an inserted flexible disk.

The head mounting structure as described includes additionally electrical connections to the heads 60, 60a. A flexible cable 61 of fork-like configuration leads to a connector 62. The cable, when installed, is held against the bottom post by means of a loop element 65 whose arms have lugs 66, 66a which can engage notches 52 in plate 51. A slot 12" in the bottom 12 of part 10 is used to pass the cable 61 through and the connector 62 is affixed to the outside of member 10 for the connector of cable such as 67 (FIG. 1).

As was mentioned in the introduction, the device can readily distinguish among more than just two operating states, head loading and head unloading. One can readily establish a head pre-load state in which the arms or levers 40 and 40a are pivoted forward, towards the gap 15, but not far enough that the heads 60, 60a engage the medium 1. The purpose thereof is to have the heads in a ready state following insertion of the medium. Upon moving the levers 40 and 40a, and the heads out of the ready state and into the head loading state, the heads will move over a short distance only and will, therefore, impact upon the medium at a relatively low speed. This was found to be highly desirable from a point of view of wear of the medium.

The ready or preload state can be established by holding the plunger 24b of the shuttle 20 in a position in-between the positions depicted in FIGS. 4 and 5; the balls 35, 35a are pushed into the ducts 18, 18a, but not as far as necessary for the head loading state. In conjunction with this feature, it should be noted that the plunger 25b is not necessarily operated by a relay affixed to the frame 10a,b. The plunger 24b may well be operated differently.

It should be noted that reference was made occasionally above concerning the insertion of recording disk 1. This insertion actually results from movement of the frame 10, 10a relative to disk 1 which spins about a stationary axis. The head mount frame composed of parts 10, 10a is moved by a voice coil motor or the like in radial direction to place the heads 60, 60a, into alignment with particular tracks on the spinning disk. This movement of the head mount structure 10, 10a is usually to be carried out quite rapidly and the relay adds significant weight. Thus, one may eliminate the relay and place a bar alongside the frame 10, 10a to be moved transversely, e.g. by one or several stationary relays for operating the plunger 24b from different positions relative to that bar and the disk. This mode of operation makes also easier the implementation of the head preload feature. The bar is actuated by different relays for the pre-load and the head loading modes, and the stroke length of these relays differ corresponding to the different length of plunger displacement.

The invention is not limited to the embodiments described above but all changes and modifications thereof not constituting departures from the spirit and scope of the invention are intended to be included.

I claim:

1. A dual head mounting structure for cooperation with a flexible media, comprising:

a frame defining a gap in-between for insertion of said media, the frame having first and second mounting space in its interior, adjacent said gap;

a rocking lever in each said mounting space, there being two rocking levers accordingly, each being separately pivoted on parallel axes in said frame, so that a forward arm of each lever can pivot towards and away from said gap;

a first and a second spring, each having three parallelly extending leaf spring arms joined at one end for common mounting of each spring to said frame, respectively, in said first and second mounting space, two outer ones of the three arms being joined by a platform, there being two platforms accordingly, a middle arm of each spring having means for engaging said platform from opposite sides, but only one side at a time;

a pair of heads respectively mounted on said platforms, facing each other across said gap;

said foward arms of said levers, respectively, provided to engage said center arms of said springs for pivoting and flexing the center arm away from said gap when said lever arms are pivoted away from said gap;

spring means for biasing said rocking levers to a pivot position in which said heads are held away from said gap; and operating means in said frame for pivoting said rocking levers towards each other so that said spring arms can flex back to place said heads into abutment or into abutment with a media from opposite sides when in said gap.

2. Mounting structure as in claim 1, said center spring arm having a pair of lugs, said rocking lever having two tongues for engaging said lugs.

3. Mounting structure as in claim 1 or 2, said means for engaging including a first tongue for lodging against the platform opposite the head thereon, and further including two arms placed alongside said head, either said first tongue or said two arms engaging the platform, from opposite sides, depending upon the pivot position of the respective rocking lever.

4. A dual head mounting structure for cooperation with a flexible media, and which includes a first and a second spring each having three parallelly extending leaf spring arms joined at one end for common mounting, two outer ones of the three arms being joined by a platform, there being two platforms accordingly, heads being, respectively, mounted on said platform, a middle one of each spring arm having means for engaging said platform from opposite sides, but only one side at a time; the improvement comprising:
    a frame part defining a gap in-between for insertion of said media, the frame having first and second mounting space in its interior, adjacent said gap, said first and second springs being respectively mounted by the one end to the first and second mounting spaces;
    a rocking lever in each said mounting space, there being two rocking levers accordingly, each being separately pivoted on parallel axes so that a forward arm can pivot towards and away from said gap, said forward arms of said levers, respectively, provided to engage said middle arms of said springs for pivoting and flexing the middle arm away from said gap when said lever arms are pivoted away from said gap;
    spring means for biasing said rocking levers to a pivot position in which arms are held away from said gap; and
    operating means for pivoting said rocking levers towards each other so that said spring arms can flex back to place said heads into abutment or into abutment with a media from opposite sides when in said gap.

5. A dual head mounting structure for cooperation with a flexible media, comprising:
    a frame defining a gap in-between for insertion of said media;
    a first and a second rocking lever, each being separately pivoted on parallel axes in said frame so that a forward arm can pivot towards and away from said gap;
    a first and a second spring means each mounted with one end in said frame for resiliently mounting first and second heads;
    said forward arms of said levers, respectively, provided to engage said spring means for pivoting and flexing the spring means away from said gap when said lever arms are pivoted away from said gap;
    further spring means for biasing said rocking levers to a pivot position in which arms are held away from said gap; and
    operating means in said frame for pivoting said rocking levers towards each other so that said first and second means spring can flex back to place said heads into abutment or into abutment with a media from opposite sides when in said gap:

6. Mounting structure as in claim 1, 4 or 5, said operating means including two balls and a cone member for spreading the balls apart, the balls engaging the other arms of said rocking levers to pivot them into said head engaging position, and means for shifting the cone member so that the spring bias of said rocking levers returns them into the receding position.

* * * * *